US009601080B1

United States Patent
Faaborg et al.

(10) Patent No.: US 9,601,080 B1
(45) Date of Patent: Mar. 21, 2017

(54) SYSTEMS AND METHODS FOR VIRTUALLY WEIGHTED USER INPUT ELEMENTS FOR PERFORMING CRITICAL ACTIONS

(71) Applicant: Google Inc., Mountain View, CA (US)

(72) Inventors: Alexander Faaborg, Mountain View, CA (US); Simon Tickner, Whitstable (GB); Daniel Shiplacoff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 14/078,893

(22) Filed: Nov. 13, 2013

(51) Int. Cl.
*G09G 5/00* (2006.01)
*G06F 3/0488* (2013.01)

(52) U.S. Cl.
CPC .......... *G09G 5/006* (2013.01); *G06F 3/0488* (2013.01)

(58) Field of Classification Search
CPC ................ G06F 3/048–3/04897; G09G 5/006
See application file for complete search history.

(56) References Cited

U.S. PATENT DOCUMENTS

| 2004/0189714 | A1* | 9/2004 | Fox et al. ...................... 345/810 |
| 2010/0257490 | A1* | 10/2010 | Lyon et al. .................... 715/863 |
| 2012/0169624 | A1* | 7/2012 | Garn .................... G06F 3/04886 345/173 |
| 2013/0055170 | A1* | 2/2013 | Langlois ............... G06F 1/1626 715/863 |
| 2013/0244574 | A1* | 9/2013 | Okuno et al. ................ 455/26.1 |

* cited by examiner

*Primary Examiner* — Amr Awad
*Assistant Examiner* — Wing Chow
(74) *Attorney, Agent, or Firm* — Troutman Sanders LLP; James E. Schutz; Christopher W. Glass

(57) ABSTRACT

In an example implementation of the disclosed technology, a method includes receiving an indication of a gesture of an input object moving, at a rate of movement, from a first location of a presence-sensitive input device toward a second location of the presence-sensitive input device. The method also includes, responsive to determining that the rate of movement does not exceed a predetermined rate of movement, outputting, for display, a visual indicator moving from a first location of a display toward a second location of the display. The method also includes, responsive to determining that the rate of movement exceeds the predetermined rate of movement, outputting, for display, the visual indicator moving at a rate of movement that does not exceed the predetermined rate of movement.

19 Claims, 6 Drawing Sheets

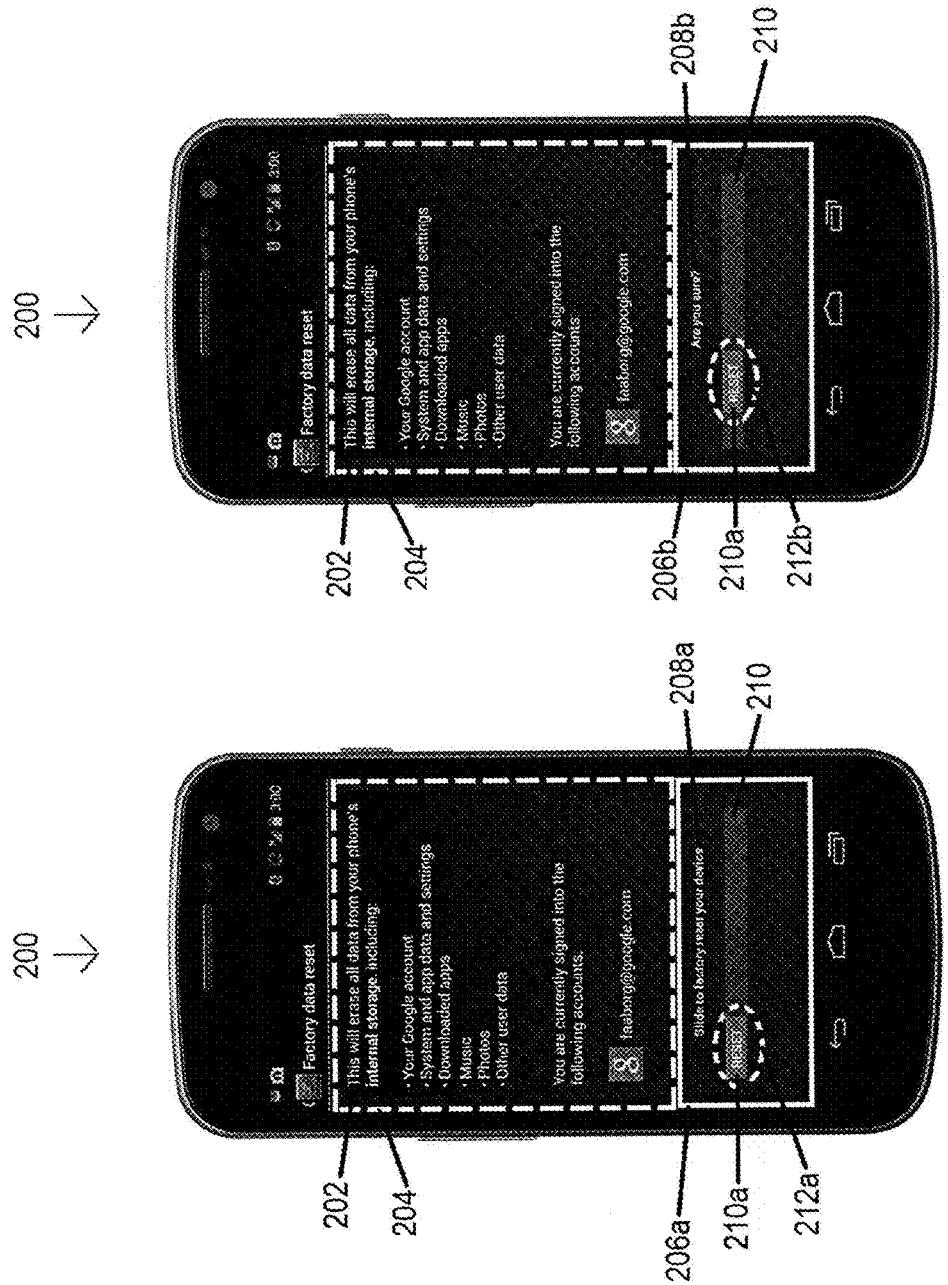

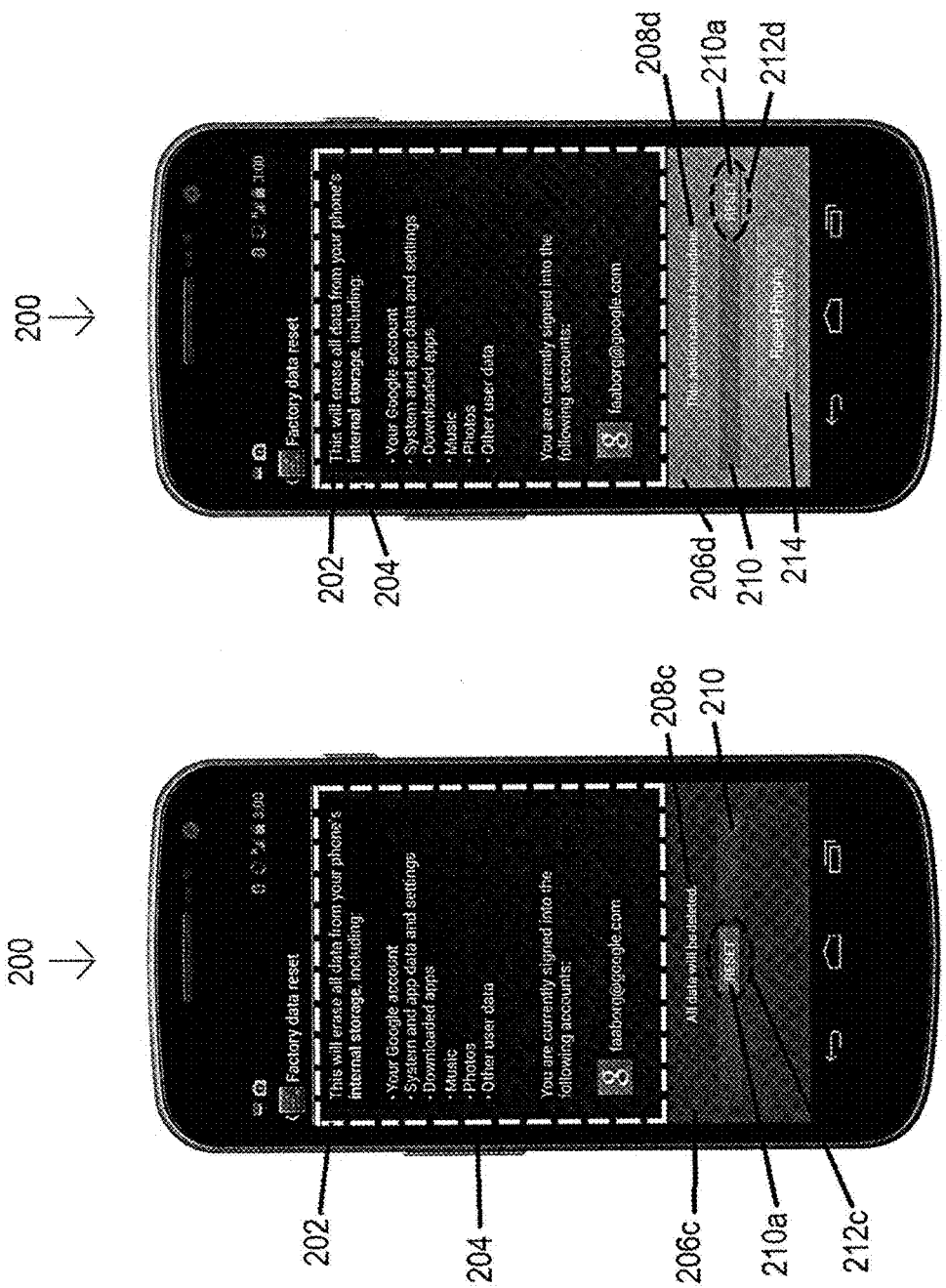

SYSTEMS AND METHODS FOR VIRTUALLY WEIGHTED USER INPUT ELEMENTS FOR PERFORMING CRITICAL ACTIONS

BACKGROUND

Computing devices may display dialog elements when a user initiates a critical action such as a system reset, operating system update, or cancellation of an account. A dialog box with a warning message may be displayed to indicate that the intended action, once made, cannot be undone. Some dialog elements require the user to affirm his intention to perform a critical action by interacting with an input element such as a click-button or checkbox. Computer users may be inundated with dialog elements on a daily basis, many of which may pertain to insignificant or non-critical matters. For example, a user may encounter frequent pop-up advertisements or routine status reports. The regular appearance of unwanted dialog elements may distract a computer user from his primary tasks, and as a result, the user may adopt a habit of simply authorizing any action to be performed without carefully considering the consequences.

SUMMARY

Some or all of the above needs may be addressed by certain implementations of the disclosed technology. Certain implementations may include methods, systems, and non-transitory computer-readable medium for virtually weighted user input elements for performing critical actions.

According to an example implementation, a method is provided. The method includes receiving, at a computing device, an indication of a gesture of an input object moving, at a rate of movement, from a first location of a presence-sensitive input device toward a second location of the presence-sensitive input device. The method also includes, responsive to determining, by the computing device, that the rate of movement does not exceed a predetermined rate of movement, outputting, for display, a visual indicator moving from a first location of a display toward a second location of the display. The first location of the display corresponds to the first location of the presence-sensitive input device, and the second location of the display corresponds to a second location of the presence-sensitive input device. The method also includes, responsive to determining, by the computing device, that the rate of movement exceeds the predetermined rate of movement, outputting, for display, the visual indicator moving at a rate of movement that does not exceed the predetermined rate of movement. The method also includes, responsive to determining, by the computing device, that the visual indicator, as output for display, is positioned at a third location of the display that is between the first location and second location of the display, outputting, for display, at least one text element including at least one of an instructional message and cautionary message associated with a critical action. The method also includes, responsive to determining, by the computing device, that the visual indicator, as output for display, is positioned proximate the second location of the display, performing an action.

According to another example implementation, a system is provided. The system includes a display, a presence-sensitive input device, and one or more processors in communication with the presence-sensitive input device and display. The system also includes at least one memory in communication with the one or more processors. The memory is configured for storing data and instructions that, when executed by the one or more processors, cause the system to receive an indication of a gesture of an input object moving, at a rate of movement, from a first location of a presence-sensitive input device toward a second location of the presence-sensitive input device. The stored data and instructions, when executed by the one or more processors, further cause the system to, responsive to determining that the rate of movement does not exceed a predetermined rate of movement, output, for display, a visual indicator moving from a first location of the display toward a second location of the display. The first location of the display corresponds to the first location of the presence-sensitive input device and the second location of the display corresponds to the second location of the presence-sensitive input device.

The stored data and instructions, when executed by the one or more processors, further cause the system to, responsive to determining that the rate of movement exceeds the predetermined rate of movement, output, for display, the visual indicator moving at a rate of movement that does not exceed the predetermined rate of movement. The stored data and instructions, when executed by the one or more processors, further cause the system to, responsive to determining that the visual indicator, as output for display, is positioned at a third location of the display that is between the first location and second location of the display, output, for display, at least one text element including at least one of an instructional message and cautionary message associated with a critical action. The stored data and instructions, when executed by the one or more processors, further cause the system to, responsive to determining that the visual indicator, as output for display, is positioned proximate the second location of the display, perform an action.

According to another example implementation, a non-transitory computer-readable medium is provided that stores data and instructions that, when executed by one or more processors in a system, cause the system to perform a method. The method includes receiving an indication of a first gesture of an input object moving, at a rate of movement, from a first location of a presence-sensitive input device toward a second location of the presence-sensitive input device. The method also includes, responsive to determining that the rate of movement does not exceed a predetermined rate of movement, outputting, for display, a visual indicator moving from a first location of a display toward a second location of the display. The first location of the display corresponds to the first location of the presence-sensitive input device and the second location of the display corresponds to a second location of the presence-sensitive input device.

The method also includes, responsive to determining that the rate of movement exceeds the predetermined rate of movement, outputting, for display, the visual indicator moving at a rate of movement that does not exceed the predetermined rate of movement. The method also includes, responsive to determining that the visual indicator, as output for display, is positioned at a third location of the display that is between the first location and second location of the display, outputting, for display, at least one text element including at least one of an instructional message and cautionary message associated with a critical action. The method also includes, responsive to determining that the visual indicator, as output for display, is positioned proximate the second location of the display, performing an action.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIGS. 2A-2D illustrate a computing device 200 according to an example implementation.

DETAILED DESCRIPTION

Figure 1:
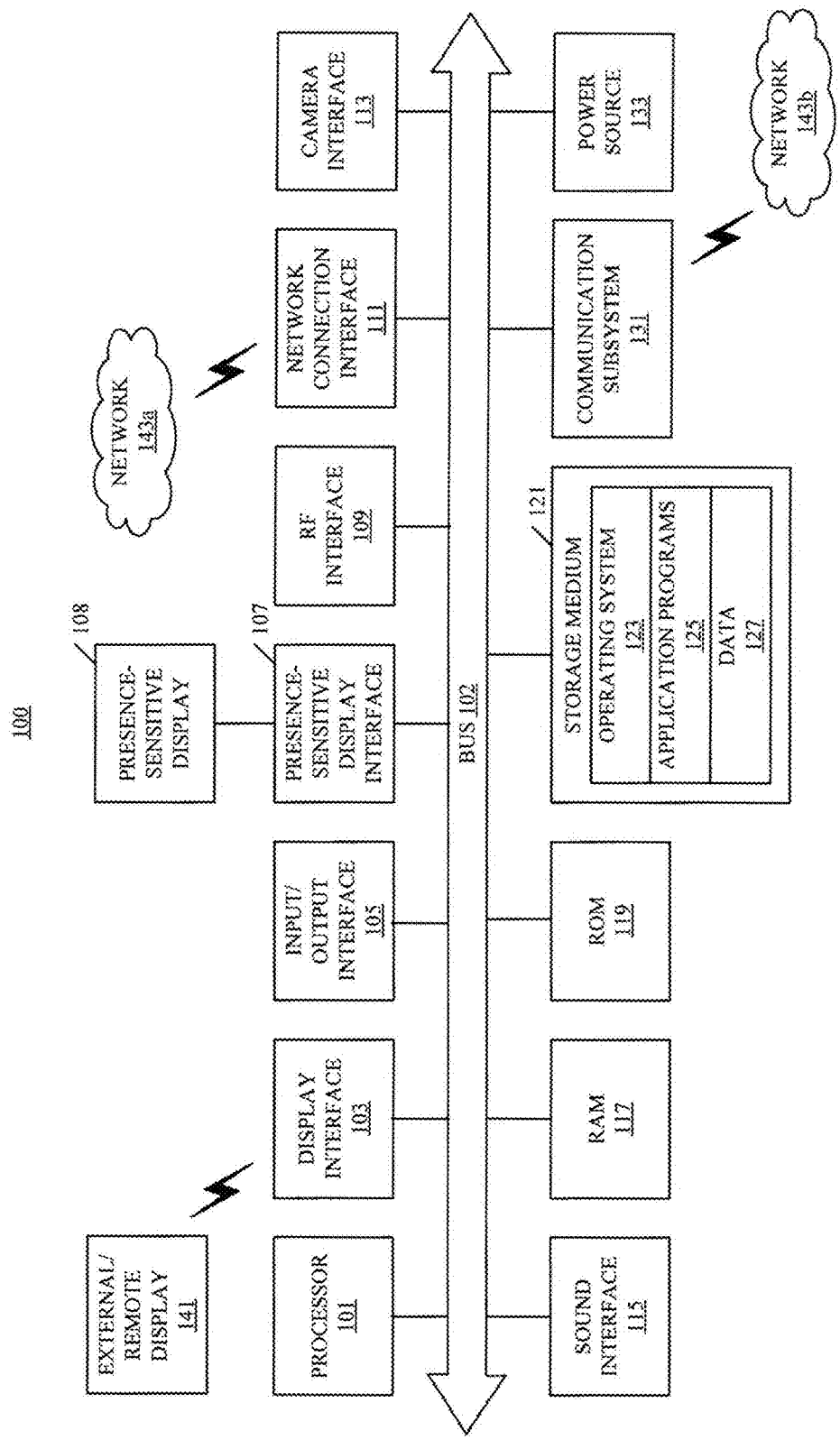
FIG. 1 is a block diagram of an illustrative computer system architecture 100, according to an example implementation.

In certain implementations of the disclosed technology, characteristics of the response associated with a displayed user input element may vary according to the manner in which the input gesture is performed. In an example implementation, a user input element may be virtually weighted. As used herein, virtual weighting of a user input element may refer to a level or rate of movement, acceleration, or other measure of responsiveness associated with a user input element of a computing device in response to one or more user input gestures. In an example implementation, the computing device may be configured to limit responsiveness associated with a displayed user input element such that a critical action, for example a system reset, operating system update, or cancellation of an account, will not be performed unless an input gesture is performed in a particular manner.

In an example implementation, when a user enters an input gesture at an input device, for example a touch-sensitive input device, the computing device determines a rate of movement in which the gesture was performed. In response to the computing device determining that the rate of movement of the gesture does not exceed a predetermined rate of movement, for example a maximum rate of movement, the computing device outputs, for display, a visual indicator as advancing from a first location of a display toward a second location of the display. In response to the computing device determining that the rate of movement of the gesture exceeds the predetermined rate of movement, the computing device outputs, for display, the visual indicator as stopped in position, or in an initial position, or moving in a direction substantially opposite the direction of the gesture (i.e. moving backwards in position). As a result, a user may effectively be forced to focus more carefully on correctly performing the input gesture, which thereby may increase the likelihood that the user will read and consider messages provided throughout displayed text elements, such as cautionary messages, before confirming his intent to perform the critical action.

In certain implementations, more than one type of user input element may be associated with permitting a critical action to be performed. For example, the computing device may be configured such that a user must interact with two interface elements, in two different ways, in order to confirm his intention to perform a critical action. The user is thereby required to perform an additional, separate and different type of input gesture before the computing device will perform a critical action. By requiring the user to read various messages, such as cautionary messages, as he enters a first input gesture and then requiring the user to enter a second, different type of input gesture, the user may be more likely to fully consider the consequences of performing the critical action.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

FIG. 1 is a block diagram illustrating an example implementation of a computing device 100 in accordance with various aspects set forth herein. Certain aspects of FIG. 1 may be embodied in the computing device 200 as shown in FIGS. 2A-2D or the computing device 300 shown in FIGS. 3A and 3B. In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive display, a scroll wheel, a digital camera, a digital video camera, a web camera, a microphone, a sensor, a smartcard, and the like. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a pointing device or a presence-sensitive display 108 such as a touch screen. In one definition, a presence-sensitive display is an electronic visual display that may detect the presence and location of a touch, gesture, or object near its display area. In one definition, the term "near" means on, proximate or associated with. In another definition, the term "near" is the extended spatial location of. The RF interface 109 may be configured to provide a communication interface to RF components such as a transmitter, a receiver, and an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a computer-readable medium.

FIGS. 2A-2D illustrate an example implementation of a computing device 200 comprising a presence-sensitive display 202 displaying text content 204. The presence-sensitive display 202 is configured to, in addition to displaying visual content, function as an input device to receive input gestures entered by an input object such as a stylus or finger (not shown). As shown, the computing device 200 displays a dialog box 206 with a first text element 208a and a first user input element 210 on the presence-sensitive display 202. In the example implementation shown, the first text element 208a provides instructions ("Slide to factory reset your device") that the user must follow in order to permit a factory reset. The computing device 200 is configured to output the first user input element 210 for display such that, as displayed, the first user input element 210 is a slide switch with a visual, sliding position indicator 210a ("RESET"). The computing device 200 is configured to output the position indicator 210a to, as displayed, move laterally in response to a user input gesture at the presence-sensitive display 202, for example a slide gesture or drag gesture. It is to be understood that the input functionality may alternatively be performed separate from the display functionality, for example through the use of an input device in communication with a remote display.

In response to receiving an indication of an input gesture, the computing device 200 may output the position indicator 210a for display such that, as displayed, the position indicator 210a advances from an initial position at a first location 212a of the presence-sensitive display 202 to an end position at an end location 212d (see FIG. 2D) of the presence-sensitive display 202. The computing device 200 may detect the input gesture by receiving an indication that an input object has been positioned at the presence-sensitive display 202 proximate the first location 212a and then moved laterally according to slide gesture or drag gesture. In response to receiving the indication, the computing device may output the position indicator 210a for display such that, as displayed, it advances from the initial position at the first location 212a (FIG. 2A) to the end position at the fourth location 212d (FIG. 2D). As the position indicator 210a, as displayed, advances from the initial position to the end position, it moves through intermediate positions that include a second position at a second location 212b (FIG. 2B) and a third position at a third location 212c (FIG. 2C).

The computing device 200 is configured to output caution messages (in the text elements 208a-208d) for display as the position indicator 210a, as displayed, advances towards the end position. The nature of the message content may change as the position indicator 210a advances in position. For example, the content of a message may increase in urgency in proportion to the relative position of the position indicator 210a. In the example implementation of FIGS. 2A-2D, when the position indicator 210a is proximate the first location 212a (FIG. 2A), an instructional message 208a is displayed ("Slide to factory reset your device"), and when the position indicator 210a is proximate the second location 212b, a cautionary message 208b is displayed ("Are you sure?"). As shown in FIG. 2C, when the position indicator 210c reaches a position proximate the third location 212c, a message 208c that is further cautionary is displayed ("All data will be deleted"). As shown in FIG. 2D, when the position indicator 210a reaches a position proximate the fourth location 212d, an even more cautionary message 208d is displayed ("This action cannot be undone").

Characteristics of the response associated with a displayed user input element may vary according to the manner in which the input gesture is performed. In an example implementation, a user input element may be virtually weighted. In an example implementation, the computing device 200 may be configured to limit responsiveness associated with a displayed user input element such that a critical action will not be performed unless an input gesture is performed in a particular manner.

Referring again to FIGS. 2A-2D, in an example implementation, the computing device 200 determines a rate of movement associated with the input gesture by detecting a rate at which the first gesture is entered by an input object at the presence-sensitive display 202 in a direction from a first location of the presence-sensitive display 202 towards a second location of the presence-sensitive display 202. In response to determining that the rate of movement exceeds a predetermined maximum rate of movement, the computing device 200 may output the position indicator 210a for display such that, as displayed, the position indicator 210a advances from the first location of the display 202 towards the second location of the display 202 at a rate that is less than the predetermined maximum rate of movement.

In an example implementation, the computing device 200 may be configured such that, as displayed, the responsiveness of the slide switch 210 may decrease as the position indicator 210a advances closer to the end position at the fourth location 212d. In an example implementation, the slide switch 210 may be configured such that the position indicator 210a is effectively more difficult to advance towards the end position when instructional or cautionary messages are displayed. This may effectively require a user to perform an input gesture slowly such that the position indicator 210a is effectively dragged forward at a slow rate. Also, the computing device 200 may output the slide switch 210 for display such that, if the user input gesture exceeds the maximum rate or if an input object is removed from the presence-sensitive display 202 before the position indicator 210a reaches an end position, the position indicator 210a, as displayed, stops in position or moves backwards towards the initial position.

In addition, as shown in the example implementation of FIGS. 2A-2D, the dialog box 206 (represented as 206a, 206b, 206c, and 206d respective to FIGS. 2A, 2B, 2C, and 2D), may be displayed in a color that changes from a neutral color when the position indicator 210a is positioned proximate the first location 212a and second location 212b, to a more intense color when the position indicator 210a is positioned proximate the third location 212c, and to an even more intense color when the position indicator 210a is positioned proximate the fourth location 212d. For example, the dialog boxes 206a and 206b are grey, the dialog box 206b is orange, and the dialog box 206d is red. The computing device 200 may be configured to change other visual aspects of content that is output for display on the presence-sensitive display 202, according to user interaction. For example, the displayed messages 208a-208d may increase in font size and the color of the position indicator 210a may change as the slide switch 210 advances further towards the end position.

Now referring in particular to FIG. 2D, in an example implementation, more than one type of user input element may be associated with permitting a critical action to be performed. For example, the computing device 200 may be configured such that a user must interact with two interface elements, in two different ways, in order to confirm his intention to perform a critical action. As shown in FIG. 2D, when the position indicator 210a reaches the end position proximate the fourth location 212d, a second user input element 214 (input button) is output for display. In an example implementation, when the position indicator 210a reaches or nears the end position proximate the fourth location 212d, the input button 214 is output for display, which requires a different type of input gesture to actuate, for example an isolated touch gesture, as compared to the slide gesture for moving the position indicator 210a. The user is thereby required to perform an additional, separate and different type of input gesture before the computing device 200 will perform a critical action.

In an example implementation, a user may advance the position indicator 210a, as displayed, by performing a slide gesture with one finger, and then, once the position indicator 210a has reached the end position, i.e. the position indicator 210a, as displayed, is positioned position proximate the fourth location 212d, the user must enter a second type of input gesture at a location of the presence-sensitive display 202 proximate the input button 214 before the critical action will be performed. For example, the user may be required to place a second finger on the presence-sensitive display 202 proximate the input button 214 while his first finger remains on the presence-sensitive display 202 proximate the fourth location 212d. By requiring the user to read the various messages 208 as he enters the first input gesture and then requiring the user to enter a second, different type of input gesture, the user may be more likely to fully consider the consequences of performing the critical action.

Figure 3A:
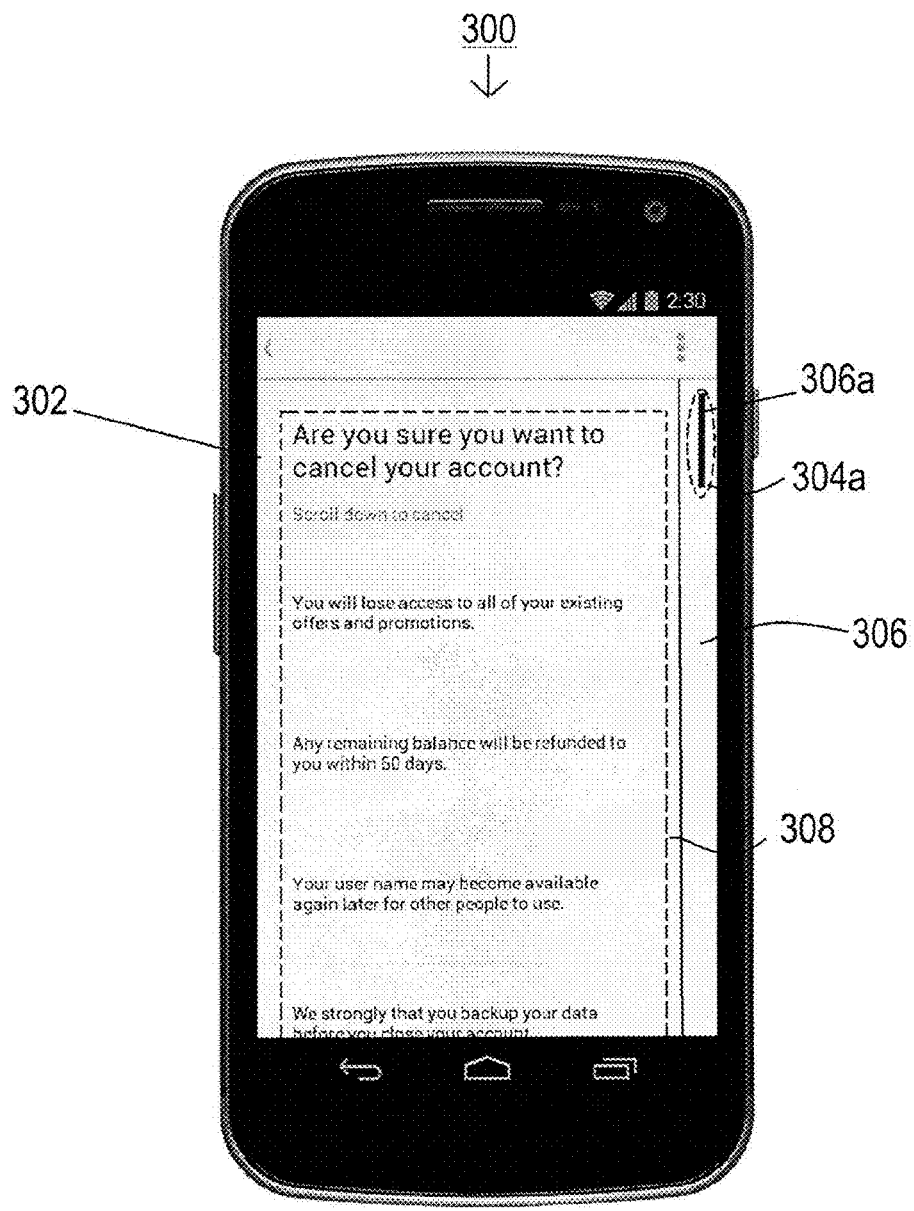
FIGS. 3A and 3B illustrate a computing device 300 according to another example implementation.
Figure 3B:

Now referring to FIGS. 3A and 3B, in an example implementation, text elements 308 are output for presentation on a presence-sensitive display 302 of a computing device 300. The computing device 300 is configured to enable vertical scrolling of the text elements 308 in response to receiving an indication that a user input gesture, such as vertical drag, swipe, or fling gesture from an input object such as a stylus or finger, has been entered at the presence-sensitive display 302 proximate a displayed user input element 306. The computing device 300 may be configured to, in response to receiving an indication that the user input gesture has been entered, output the user input element 306 for display as a vertical scroll bar with a visual position indicator 306a that, as displayed, advances from an initial position proximate a first location 304a of the presence-sensitive display 302 to an end position proximate a second location 304b of the presence-sensitive display 302. It is to be understood that the input functionality may alternatively be performed separate from the display functionality, for example through the use of an input device in communication with a remote display.

In an example implementation, the computing device 300 receives an indication that slide gesture has been entered at the presence-sensitive display 302 proximate the position indicator 306a, such that, in response, the computing device outputs the text elements 308 for display such that, as displayed, the text elements 308 scroll vertically. In the example implementation of FIGS. 3A and 3B, the computing device 300 has received an indication that a user has entered a gesture that corresponds to an action to cancel an account. Accordingly, the computing device 300 outputs the text elements 308 such that, as displayed, the text elements 308 provide instructional messages, including "Scroll down to cancel" and cautionary messages including "You will lose access to all of your existing offers and promotions" (FIG. 3A).

Content and visual aspects of the displayed messages may change as the text elements 308 are progressively scrolled in position. As shown in FIG. 3B, when the position indicator 306a reaches a position proximate the end position, a cautionary message ("All of your data will be deleted, including your email messages, photos, and documents") is displayed within a colored text box 310 to visually emphasize the importance of the message. Further, a colored dialog box 312 with an input button 314 ("Cancel Account") is displayed with a cautionary message ("You cannot undo this action") in an increased font size. The input button 314 requires a different type of gesture to actuate, for example a touch gesture at a location of the presence-sensitive display 302 corresponding to the user interaction button 314, as compared to the slide gesture for scrolling through the text elements 308. As such, two separate and different types of input gestures must be entered before the computing device 300 will perform the critical action (cancel the account).

Characteristics of the response associated with a displayed user input element may vary according to the manner in which the input gesture is performed. In an example implementation, the computing device 300 may be configured to limit responsiveness associated with a displayed user input element such that a critical action will not be performed unless an input gesture is performed in a particular manner. In an example implementation, the computing device 300 determines a rate of movement associated with the input gesture, by detecting a rate at which the first gesture is performed by an input object in a direction from a first location of the presence-sensitive display 302 towards a second location of the presence-sensitive display 302. In response to determining that the rate of movement exceeds a predetermined maximum rate of movement, the computing device 300 may output the position indicator 306a for display such that, as displayed, the position indicator 306a advances from the first location towards the second location at a rate that is less than the predetermined maximum rate of movement.

In an example implementation, the computing device 300 may be configured to output the text elements 308 for display such that, in response to receiving an indication that a slide gesture has been entered, at the presence-sensitive display 302, with a rate of movement that exceeds a predetermined maximum rate, the computing device 300 will nonetheless output the text elements 308 for display such that, as displayed, the text elements 308 scroll at a rate that is equal to or less than the maximum rate. This may prevent a user from rapidly moving through the cautionary messages without taking time to consider the implications of cancelling his account.

With reference to FIGS. 3A and 3B, in an example implementation, the computing device 300 may be configured to output the vertical scroll bar 306 and position indicator 306a for display such that responsiveness of the vertical scroll bar 306, as displayed, decreases as the position indicator 306a nears the end position. In an example implementation, the computing device 300 is configured such that, as displayed, the responsiveness of the scroll bar 306 varies in proportion to the proximity the position of the position indicator 306a relative to the end position. In an example implementation, the computing device 300 may be configured to output the scroll bar 306 and position indicator 306a for display such that, as displayed, the position indicator 306a is effectively more difficult to advance towards the end position when instructional or cautionary messages are displayed. A user is thereby required to perform an input gesture slowly such that the scroll bar 306 is effectively dragged downwards at a slow rate.

The computing device 300 may also be configured to, in response to receiving an indication that an input gesture has been entered at the presence-sensitive display 302 at a rate of movement that exceeds a predetermined maximum rate, output the position indicator 306a for display such that, as displayed, the position indicator 306a stops in position or moves backwards towards an initial position. As a result, a user may effectively be forced to focus more carefully on correctly performing the input gesture, which thereby may increase the likelihood that the user will read and consider messages provided throughout the text elements 308, such as cautionary messages, before confirming his intent to perform the critical action.

Figure 4:
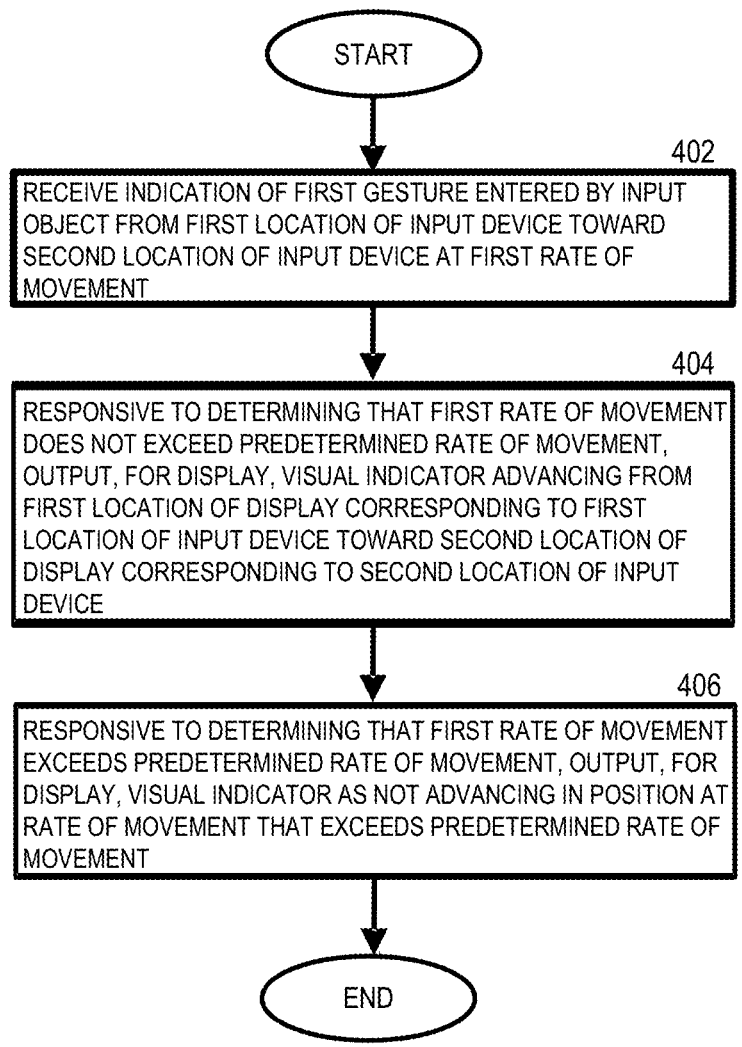
FIG. 4 is a flow diagram of a method 400 according to an example implementation.

FIG. 4 is a flow diagram of a method 400 according to an example implementation. The method 400 begins at block 402, where a computing device receives an indication of a first gesture entered by an input object from a first location of an input device toward a second location of the input device at a first rate of movement. At block 404, responsive to determining, by the computing device, that the first rate of movement does not exceed a predetermined rate of movement, the computing devices outputs, for display, a visual indicator as advancing from a first location of a display toward a second location of the display. The first location of the display corresponds to the first location of the input device and the second position of the display corresponds to a second location of the input device. At block 406, responsive to determining, by the computing device, that the first rate of movement exceeds the predetermined rate of movement, the computing device outputs, for display, the visual indicator as not advancing in position at a rate of movement that exceeds the predetermined rate of movement.

In an example implementation, the visual indicator is associated with a first user input element that is output, by the computing device, for display. Outputting, by the computing device, for display, the visual indicator as not advancing in position at a rate of movement that exceeds the predetermined rate of movement may include outputting, by the computing device, for display, the visual indicator as advancing in position at a rate of movement that does not exceed the predetermined rate of movement. Alternatively, outputting, by the computing device, for display, the visual indicator as not advancing in position at a rate of movement that exceeds the predetermined rate of movement may include outputting, by the computing device, for display, the visual indicator as stopped in position, or in an initial position, or moving in a direction substantially opposite the direction of the gesture (i.e. moving backwards in position).

In an example implementation, responsive to determining, by the computing device, that the visual indicator, as output for display, is positioned at a location of the display that is between the first location and second location of the display, the computing device outputs, for display, at least one text element. The text element may include an instructional message and/or cautionary message associated with a critical action. Responsive to determining, by the computing device, that the visual indicator, as output for display, is positioned proximate the second location of the display, the computing device may perform a critical action.

In an example implementation, responsive to determining, by the computing device, that the visual indicator, as output for display, is positioned proximate the second location of the display, the computing device may output, for display, a second user input element at a third location of the display. Responsive to receiving, at the computing device, an indication that a second gesture has been entered at a location of the input device that corresponds to a location of the display at which the second user input element is output for display, the computing device may perform a critical action.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
    receiving, at a computing device, an indication of a gesture of an input object moving, at a rate of movement, from a first location of a presence-sensitive input device toward a second location of the presence-sensitive input device;
    determining, by the computing device, whether the rate of movement exceeds a predetermined rate of movement;
    when the rate of movement does not exceed the predetermined rate of movement, outputting, for display, a visual indicator moving from a first location of a display toward a second location of the display, wherein the first location of the display corresponds to the first location of the presence-sensitive input device and the second location of the display corresponds to a second location of the presence-sensitive input device, and wherein the visual indicator is associated with a first user input element that is output for display and the responsiveness of the first user input element changes based in part on the distance of the visual indicator from the second location of the display such that the responsiveness of the first user input element decreases in proportion to the distance of the visual indicator from the second location of the display as the distance of the visual indicator from the second location of the display decreases;
    when the rate of movement exceeds the predetermined rate of movement, outputting, for display, the visual indicator moving at a rate of movement that does not exceed the predetermined rate of movement;
    responsive to determining, by the computing device, that the visual indicator, as output for display, is positioned at a third location of the display that is between the first location and second location of the display, outputting, for display, at least one text element including at least one of an instructional message and cautionary message associated with a critical action, wherein the at least one text element is output for display simultaneously with the visual indicator; and
    responsive to determining, by the computing device, that the visual indicator, as output for display, is positioned proximate the second location of the display, performing an action.

2. The method of claim 1, wherein outputting, for display, the visual indicator moving at the rate of movement that does not exceed the predetermined rate of movement comprises outputting, by the computing device, for display, the visual indicator advancing in position at the rate of movement that does not exceed the predetermined rate of movement.

3. The method of claim 1, wherein outputting, for display, the visual indicator moving at the rate of movement that does not exceed the predetermined rate of movement comprises outputting, by the computing device, for display, the visual indicator at an initial position of the visual indicator.

4. The method of claim 1, wherein outputting, for display, the visual indicator moving at the rate of movement that does not exceed the predetermined rate of movement comprises outputting, by the computing device, for display, the visual indicator moving in a direction substantially opposite the direction of the gesture.

5. The method of claim 1, wherein the action performed in response to determining that the visual indicator, as output for display, is positioned proximate the second location of the display includes outputting, by the computing device, for display, a second user input element at a third location of the display.

6. The method of claim 5, further comprising:
    responsive to receiving, at the computing device, an indication of a second gesture at a location of the presence-sensitive input device that corresponds to the third location of the display at which the second user input element is output for display, performing, by the computing device, a second action.

7. The method of claim 5, wherein the second user input element is output for display simultaneously with the first user input element.

8. A system, comprising:
    a display;
    a presence-sensitive input device;
    one or more processors in communication with the presence-sensitive input device and display; and
    at least one memory in communication with the one or more processors and configured for storing data and instructions that, when executed by the one or more processors, cause the system to:
        receive an indication of a gesture of an input object moving, at a rate of movement, from a first location of a presence-sensitive input device toward a second location of the presence-sensitive input device;
        determine whether the rate of movement exceeds a predetermined rate of movement;
        when the rate of movement does not exceed the predetermined rate of movement, output, for display, a visual indicator moving from a first location of the display toward a second location of the display, wherein the first location of the display corresponds to the first location of the presence-sensitive input device and the second location of the display corresponds to the second location of the presence-sensitive input device, and wherein the visual indicator is associated with a first user input element that is output for display and the responsiveness of the first user input element changes based in part on the distance of the visual indicator from the second location of the display such that the responsiveness of the first user input element decreases in proportion to the distance of the visual indicator from the second location of the display as the distance of the visual indicator from the second location of the display decreases;

when the rate of movement exceeds the predetermined rate of movement, output, for display, the visual indicator moving at a rate of movement that does not exceed the predetermined rate of movement;

responsive to determining that the visual indicator, as output for display, is positioned at a third location of the display that is between the first location and second location of the display, output, for display, at least one text element including at least one of an instructional message and cautionary message associated with a critical action, wherein the at least one text element is output for display simultaneously with the visual indicator; and responsive to determining that the visual indicator, as output for display, is positioned proximate the second location of the display, perform an action.

9. The system of claim 8, wherein outputting, for display, the visual indicator moving at the rate of movement that does not exceed the predetermined rate of movement comprises outputting, for display, the visual indicator advancing in position at the rate of movement that does not exceed the predetermined rate of movement.

10. The system of claim 8, wherein outputting, for display, the visual indicator moving at the rate of movement that does not exceed the predetermined rate of movement comprises outputting, for display, the visual indicator at an initial position of the visual indicator.

11. The system of claim 8, wherein outputting, for display, the visual indicator moving at the rate of movement that does not exceed the predetermined rate of movement comprises outputting, for display, the visual indicator moving in a direction substantially opposite the direction of the gesture.

12. The system of claim 8, wherein the action performed in response to determining that the visual indicator, as output for display, is positioned proximate the second location of the display includes outputting, for display, a second user input element at a third location of the display.

13. The system of claim 12, wherein the stored data and instructions, when executed by the one or more processors, further cause the system to:

responsive to receiving an indication of a second gesture at a location of the presence-sensitive input device that corresponds to the third location of the display at which the second user input element is output for display, perform a second action.

14. A non-transitory computer-readable medium that stores data and instructions that, when executed by one or more processors in a system, cause the system to perform a method comprising:

receiving an indication of a first gesture of an input object moving, at a rate of movement, from a first location of a presence-sensitive input device toward a second location of the presence-sensitive input device;

determining whether the rate of movement exceeds a predetermined rate of movement;

when the rate of movement does not exceed the predetermined rate of movement, outputting, for display, a visual indicator moving from a first location of a display toward a second location of the display, wherein the first location of the display corresponds to the first location of the presence-sensitive input device and the second location of the display corresponds to a second location of the presence-sensitive input device, and wherein the visual indicator is associated with a first user input element that is output for display and the responsiveness of the first user input element changes based in part on the distance of the visual indicator from the second location of the display such that the responsiveness of the first user input element decreases in proportion to the distance of the visual indicator from the second location of the display as the distance of the visual indicator from the second location of the display decreases;

when the rate of movement exceeds the predetermined rate of movement, outputting, for display, the visual indicator moving at a rate of movement that that does not exceed the predetermined rate of movement;

responsive to determining that the visual indicator, as output for display, is positioned at a third location of the display that is between the first location and second location of the display, outputting, for display, at least one text element including at least one of an instructional message and cautionary message associated with a critical action, wherein the at least one text element is output for display simultaneously with the visual indicator; and responsive to determining that the visual indicator, as output for display, is positioned proximate the second location of the display, performing an action.

15. The non-transitory computer-readable medium of claim 14, wherein outputting, for display, the visual indicator moving at the rate of movement that does not exceed the predetermined rate of movement comprises outputting, for display, the visual indicator advancing in position at the rate of movement that does not exceed the predetermined rate of movement.

16. The non-transitory computer-readable medium of claim 14, wherein outputting, for display, the visual indicator moving at the rate of movement that does not exceed the predetermined rate of movement comprises outputting, for display, the visual indicator at an initial position of the visual indicator.

17. The non-transitory computer-readable medium of claim 14, wherein outputting, for display, the visual indicator moving at the rate of movement that does not exceed the predetermined rate of movement comprises outputting, for display, the visual indicator moving in a direction substantially opposite the direction of the gesture.

18. The non-transitory computer-readable medium of claim 14, wherein the action performed in response to determining that the visual indicator, as output for display, is positioned proximate the second location of the display includes outputting, for display, a second user input element at a third location of the display.

19. The non-transitory computer-readable medium of claim 18, wherein the method further comprises:

responsive to receiving, at the computing device, an indication of a second gesture at a location of the presence-sensitive input device that corresponds to the third location of the display at which the second user input element is output for display, performing a second action.

* * * * *